United States Patent [19]

Kasahara et al.

[11] Patent Number: 4,866,478
[45] Date of Patent: Sep. 12, 1989

[54] ILLUMINATING DEVICE FOR A COLOR COPIER

[75] Inventors: Nobuo Kasahara; Nobuyuki Sato; Yukio Noguchi, all of Yokohama, Japan

[73] Assignee: Ricoh Company, Ltd., Tokyo, Japan

[21] Appl. No.: 162,128

[22] Filed: Feb. 29, 1988

[30] Foreign Application Priority Data

Feb. 28, 1987 [JP] Japan .............................. 62-29845[U]
Feb. 28, 1987 [JP] Japan .............................. 62-29846[U]

[51] Int. Cl.⁴ .......................................... G03B 27/54
[52] U.S. Cl. ........................................ 355/70; 362/11
[58] Field of Search ................ 355/70, 4, 69; 362/3, 362/11, 16, 18, 241

[56] References Cited

U.S. PATENT DOCUMENTS 3,609,039 9/1971 Ambraschka ........................ 355/70
4,668,081 5/1987 Imamura .......................... 362/11 X

FOREIGN PATENT DOCUMENTS 3014016 10/1980 Fed. Rep. of Germany ........ 362/11

Primary Examiner—L. T. Hix
Assistant Examiner—David M. Gray
Attorney, Agent, or Firm—Oblon, Spivak, McClelland, Maier & Neustadt

[57] ABSTRACT

A slit exposure type illuminating device mainly applicable to a color electrophotographic copier and using a plurality of lamps includes a single reflector which is provided with a plurality of openings for inserting the lamps. The lamps are arranged in an array along the length of the reflector. One of the lamps is positioned on an optical axis which extends through the center of the reflector with respect to the lengthwise direction of the reflector. The lamps are divided into a first and a second lamp groups in each of which they are arranged symmetrically with respect to the optical axis and individually spaced by predetermined distances from the optical axis. Current is fed either independently or simultaneously to the two different lamp groups. The openings of the reflector are each so adjustable in position and dimension as to prevent the bulb of each lamp from intercepting light.

8 Claims, 8 Drawing Sheets

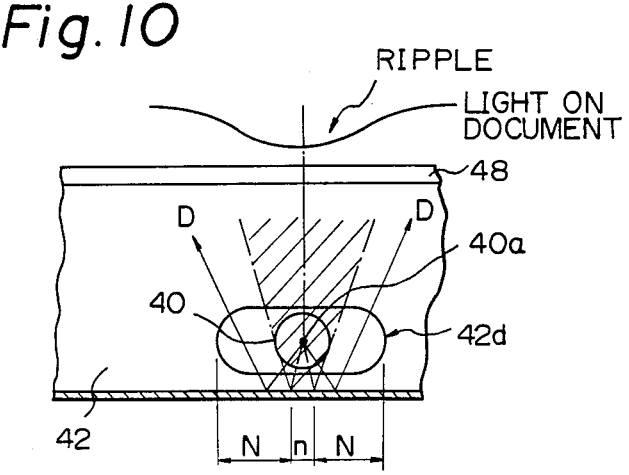
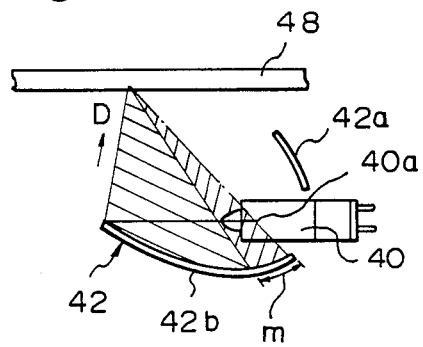
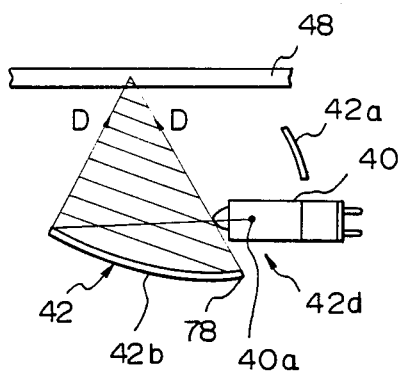

ILLUMINATING DEVICE FOR A COLOR COPIER

BACKGROUND OF THE INVENTION

The present invention relates to a slit exposure type illuminating device which is mainly applicable to a color electrophotographic copier and uses a plurality of lamps such as halogen lamps.

In a prior art illuminating device for a color electrophotographic copier, a plurality of lamps are arranged in a horizontal array and are individually mounted on independent reflectors. This kind of arrangement has various drawbacks left unsolved, as follows. The lamps have to be accurately oriented in the X, Y and Z directions one by one such that the centers of their filaments are aligned with predetermined adequate positions. The lamps are usable with a predetermined kind of illuminating unit only. Since current is fed to the lamps by a bundle of wires, not only the operability is poor but also the lamps are susceptible to vibrations and, therefore, unfeasible for rapid movement. For these reasons, the prior art illuminating device is poor in productivity resulting in disproportionate cost, and the whole illuminating unit has to be replaced when any of the lamps fails because an irregular illuminance distribution cannot be compensated for by a lamp only. This is undesirable from the maintenance and economy standpoint. In addition, the device is limited in durability because its lamp harness and lamp bracket are limited in mechanical strength and apt to become loose.

Further, in a prior art color electrophotographic copier, two illuminating units of the same or different kind and each implemented with halogen lamps, fluorescent lamps or the like are individually disposed before and after a slit exposing surface. To adjust the amount of exposure for color separation, the illuminating units are controlled to turn on their lamps either independently or simultaneously or, alternatively, the voltage applied to the respective lamps is varied. A problem with the turn-on control scheme is that numerous structural elements are needed resulting in an increase in cost, poor reliability, and low illumination efficiency. On the other hand, the voltage control scheme is disadvantageous in that the adjustable range of light amount is narrow due to the variation of color temperature of light. Besides, in a color copier of the type having a plurality of slit exposing sections and using a blue, a green and a red fluorescent lamp, the illuminating device is extremely complicated in construction.

It has been customary to locally frost the bulb of a lamp with the intention of diffusing light and, thereby, eliminating ripples which would entail an irregular illuminance distribution on an original document to be copied. However, locally frosting the bulb of a lamp is time-consuming and costly.

SUMMARY OF THE INVENTION

It is, therefore, an object of the present invention to provide a slit exposure type illuminating device mainly applicable to a color electrophotographic copier of the type using a plurality of halogen lamps or the like, which device suppresses irregularity in illuminance and enhances efficient illumination.

It is another object of the present invention to provide an energy-saving slit exposure type illuminating device which is mainly applicable to a color electrophotographic copier of the type using a plurality of halogen lamps or the like.

It is another object of the present invention to provide an inexpensive and highly productive slit exposure type illuminating device which is mainly applicable to a color electrophotographic copier of the type using a plurality of halogen lamps or the like.

It is another object of the present invention to provide a slit exposure type illuminating device mainly applicable to a color photographic copier of the type using a plurality of halogen lamps or the like, which device promotes the ease of maintenance.

It is another object of the present invention to provide a durable slit exposure type illuminating device which is mainly applicable to a color photographic copier of the type using a plurality of halogen lamps or the like.

It is another object of the present invention to provide a generally improved illuminating device for a color electrophotographic copier.

A device for uniformly illuminating a slit-like area of the present invention comprises a support member, a base plate removably mounted on the support member and having a feed circuit thereon, a reflector fixed to the support plate and formed with a plurality of openings, and a plurality of lamps inserted in the openings of the reflector and arranged in an array in a lengthwise direction of the reflector.

BRIEF DESCRIPTION OF THE DRAWINGS

The above and other objects, features and advantages of the present invention will become more apparent from the following detailed description taken with the accompanying drawings in which:

FIGS. 10 to 12 are schematic views showing how a main reflector of the illuminating device reflects light.

DESCRIPTION OF THE PREFERRED EMBODIMENT

Figure 1:
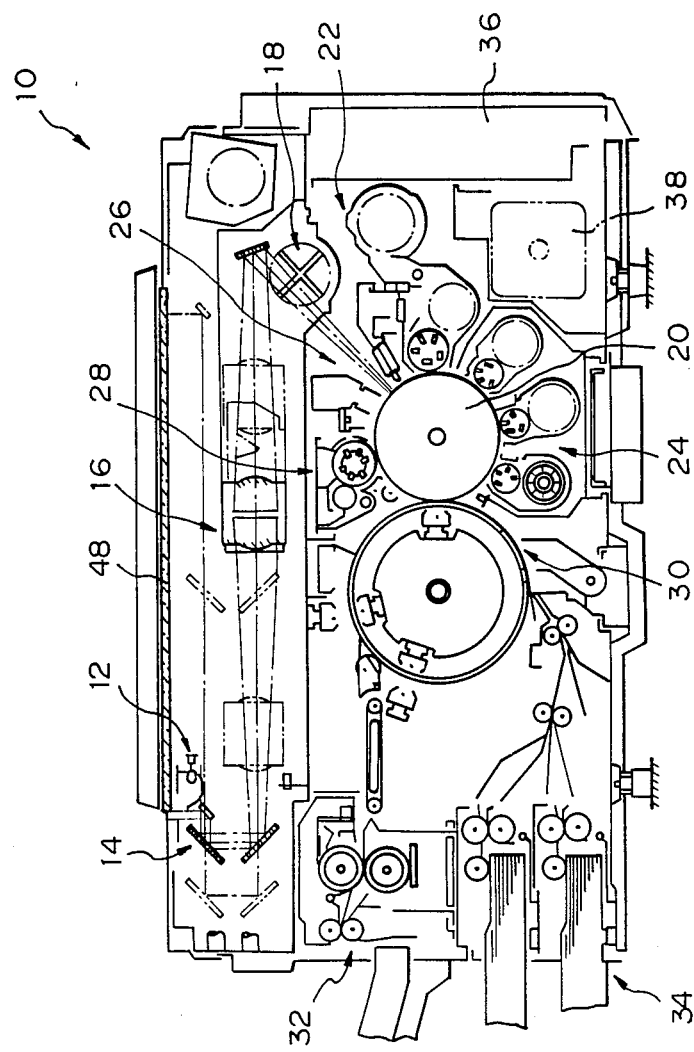
FIG. 1 is a sectional side elevation of a color electrophotographic copier in which an illuminating device in accordance with the present invention is installed.

Referring to FIG. 1 of the drawings, a color electrophotographic copier in which an illuminating device of the present invention is installed is shown and generally designated by the reference numeral 10. As shown, the copier 10 includes an illuminating device 12, a mirror 14, a lens carriage 16 supporting a lens, a filter 18 serving as color separating means, a photoconductive drum 20, a black developing unit 22, a color developing unit 24, a discharger 26, a cleaning device 28, a transfer drum device 30, a fixing device 32, a paper feed device 34, a control device 36, and a power supply device 38.

Figure 2:
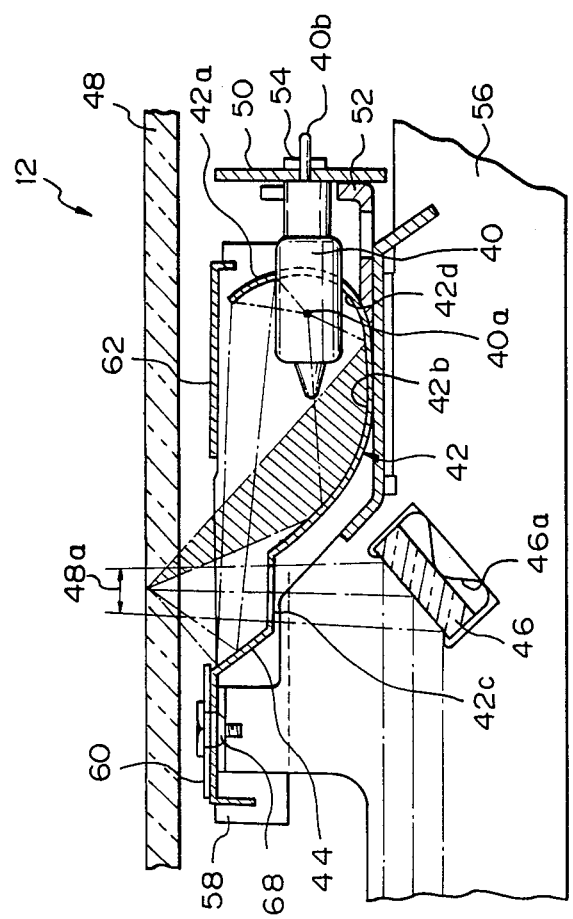
FIG. 2 is a sectional side elevation showing one embodiment of the illuminating device of the present invention.

As shown in FIG. 2, the illuminating device 12 is generally made up of lamps (halogen lamps) 40, a main reflector 42, and an auxiliary reflector 44 which are individually located to face a glass platen 48. The main reflector 42 is constituted by an upper and a lower elliptical surface 42a and 42b, respectively, the auxiliary reflector facing the upper elliptical surface 42a. A slit 42c is formed through the main reflector 42 between the lower elliptical surface 42b of the latter and the auxiliary reflector 44. Located below the slit 42c is a first mirror 46 which is fixed in place by a leaf spring 46a. The upper elliptical surface 42a of the main reflector 42 has a first and a second focus which are positioned at, respectively, a light emitting portion 40a of each lamp 40 and a slit-like illuminating area 48a on the glass platen 48. Likewise, the lower elliptical surface 42b has a first and a second focus which are located at, respectively, the light emitting portion 40a and the slit-like illuminating area 48a.

Figure 3:
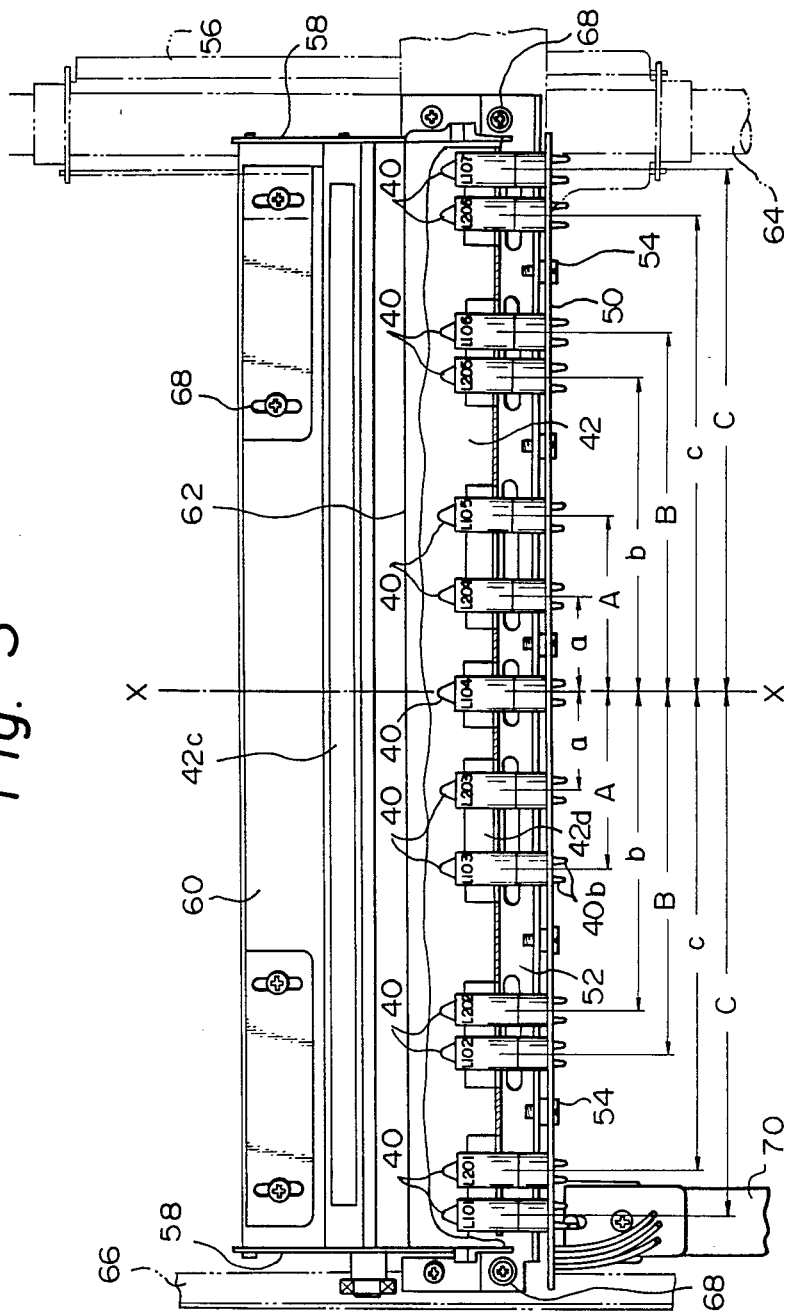
FIG. 3 is a partly taken away plan view of the device shown in FIG. 2.

As best shown in FIG. 3, the lamps 40 are arranged in a horizontal array. Light issuing from the lamps 40 is reflected by the reflectors 42 and 44 to illuminate that part of an original document which is in register with the illuminating area 48a on the glass platen 48, as shown in FIG. 2. The light reflected by the document is focused onto the photoconductive drum 20 by way of the first mirror 46, lens, and others.

Figure 4:
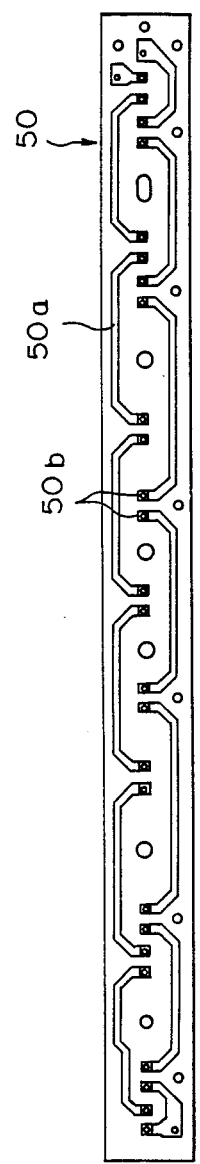
FIG. 4 is a plan view of a base plate on which lamps of the device of FIG. 2 are mounted.
Figure 5:
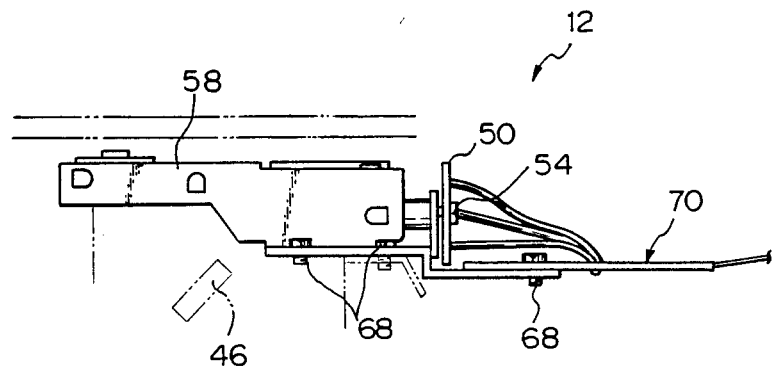
FIG. 5 is a side elevation showing the device of FIG. 2.

Referring to FIG. 4, there is shown a printed circuit board 50 on which the lamps 40 are mounted. Specifically, the lamps 40 are mounted on the printed circuit board 50 with their pins, or terminals, 40b (FIG. 2) inserted in apertures 50b which are formed through printed circuits 50a. The lamps 40 are fastened by screws 54 to a holder 52 to which the main reflector 42 is fixed, in such a manner that they are inserted through openings 42d of the main reflector 42 to the interior of the main reflector 42. The holder 52 is rigidly connected to a scanner body 56. FIG. 5 shows the illuminating device 12 in a side elevation. In the drawings, the reference numeral 58 designates side reflectors, 60 an illuminance correcting plate, 62 an upper shield plate, 64 a scanner guide rod, 66 a guide roll, 68 set screws, and 70 a feed cable.

Figure 6:
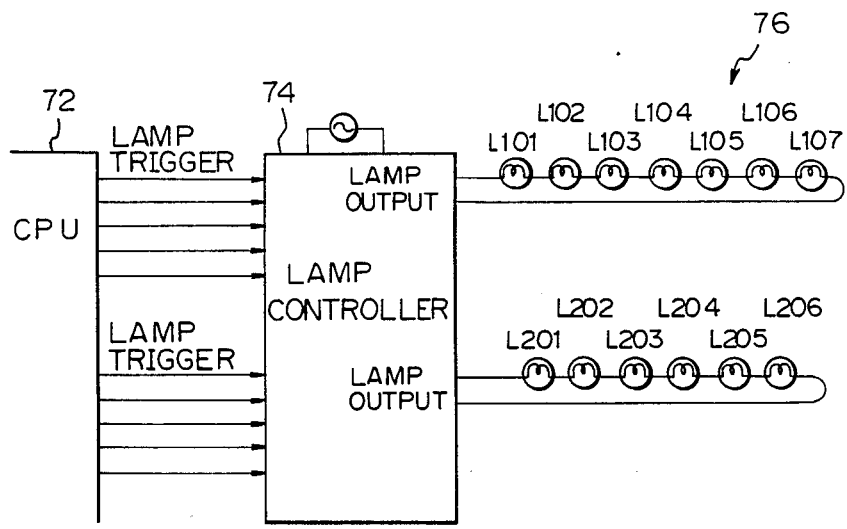
FIG. 6 is a schematic block diagram representative of a control device associated with the illuminating device.

As shown in FIG. 3, the lamps 40 comprise a lamp L104 located along an optical axis X—X, a first lamp group L1, and a second lamp group L2. The first lamp group L1 is constituted by lamps L101, L102, L103, L105, L106 and L107 which are arranged symmetrically with respect to the optical axis X—X on opposite sides of the lamp L104 and spaced by distances A, B and C as measured from the axis X—X. Likewise, the second lamp group L2 is constituted by lamps L201, L202, L203, L204, L205 and L206 which are positioned symmtetrically with respect to the optical axis X—X on opposite sides of the lamp L104 and spaced by distances a, b and c as measured from the axis X—X. As shown in FIG. 6, current supply to the two different lamp groups L1 and L2 is controlled by a control device 76 which includes a central processing unit (CPU) 72 and a lamp controller 74.

Figure 7:
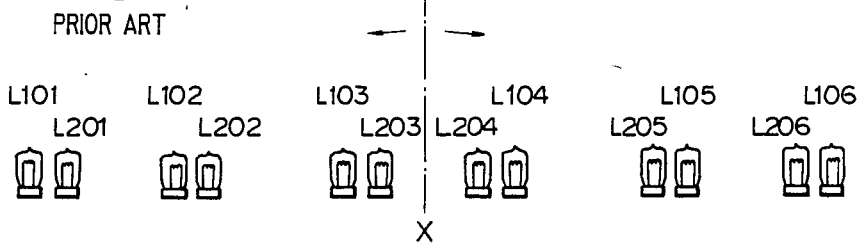
FIG. 7 is a view showing a lamp arrangement in accordance with a prior application.

Referring to FIG. 7, there is shown a lamp arrangement which is proposed in a prior application, i.e. Japanese patent application No. 61-42998. As shown, the lamp arrangement is void of the lamp L104 of the present invention. Stated another way, the lamp arrangement in accordance with the present invention includes an additional lamp L104 which is located on the optical axis X—X and belongs to the lamp group L1. With this construction, the present invention allows an adequate light distribution to be set up on an original document in any of three different cases: a case wherein the lamp group L1 is turned on, a case wherein the lamp group L2 is turned on, and a case wherein both the lamp groups L1 and L2 are turned on.

The basic construction of the illuminating device in accordance with the present invention may be summarized as follows.

(1) A single slit exposing section 48 is provided.

(2) A plurality of lamps 40 are arranged in the lengthwise direction of the main reflector 42.

(3) The lamps 40 are mounted on a single base plate which is implemented with the printed circuit board 50.

(4) The lamps 40 and the base plate 50 are configured into a unit, and the lamps 40 are positioned on the base plate 50 such that the light emitting center of each lamp 40 is located at a predetermined position.

(5) The lamp unit is fastened to the holder 52 which is adapted to connect the reflector unit and the lamp unit to each other and to connect them to the scanner 56. Thus, the dimensions are determined such that when the reflector unit and lamp unit are connected to the scanner 56, the light emitting center 48a of each lamp 40 is brought to its correct position.

(6) The lamp unit can be replaced with ease by removing several screws from the lamp unit and, then, the set screws 68 which is associated with the feed cable 70.

Wattages of the lamps 40 are selected as follows. The lamps L101, L104 and L107 each has a wattage of 40 watts, the lamps L102, L103, L105, L106 and L202 to L205 each has a wattage of 50 watts, and the lamps L201 and L206 each has a wattage of 60 watts. Thus, the wattage of each of the lamp groups L1 and L2 is 320 watts, the total wattage being 640 watts.

Figure 8:
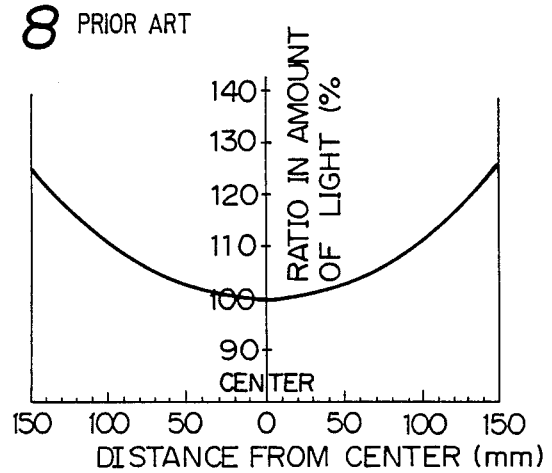
FIG. 8 is a plot representative of a light distribution on an original document which is illuminated by the device of FIG. 7.
Figure 9:
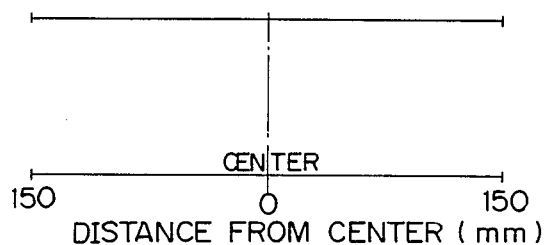
FIG. 9 is a diagram showing the distribution of light as measured on an original document.

The distances A, B and C, FIG. 3, of the lamp group L1 as measured from the optical axis X—X are selected to be 52 millimeters, 106 millimeters and 153 millimeters, respectively. On the other hand, the distances a, b and c are selected to be 29 millimeters, 93 millimeters and 140 millimeters, respectively. With such distances, the device sets up a light distribution on an original document as shown in FIG. 8. This light distribution in turn provides a flat light distribution on the surface of the photoconductive drum 20 which has little irregularity in illuminance, as shown in FIG. 9.

The numerical values shown in the graph of FIG. 8 are tabulated below.

| DISTANCE FROM CENTER | RATIO IN LIGHT AMOUNT (%) | SCATTERING |
|---|---|---|
| 0 mm | 100.1 | =5% |
| ±10 | 100.1 | " |
| ±20 | 100.4 | " |
| ±30 | 101.0 | " |
| ±40 | 101.7 | " |
| ±50 | 102.7 | " |
| ±60 | 103.9 | " |
| ±70 | 105.4 | " |
| ±80 | 107.0 | " |
| ±90 | 109.0 | " |

-continued

| DISTANCE FROM CENTER | RATIO IN LIGHT AMOUNT (%) | SCATTERING |
|---|---|---|
| ±100 | 111.1 | " |
| ±110 | 113.5 | " |
| ±120 | 116.2 | " |
| ±130 | 119.1 | " |
| ±140 | 122.3 | " |
| ±150 | 125.8 | " |

Assuming that the lamp group L1 is turned on by 85 volts and 320 watts, current consumed is 3.76 amperes. Likewise, when the lamp group L2 is turned on by 85 volts and 320 watts, current consumed is 3.76 amperes. Then, the total current consumption is 7.52 amperes. In the case of a conventional single lamp, it has to be implemented with a 85 volts and 640 watts halogen lamp so that 320 watts lamp power, for example, is unattainable unless the voltage applied to the lamp is changed. The voltage $V_1$ applied to the lamp is expressed as:

$$V_1 = (W/W_o)^{1/k} \times V_o \qquad \text{Eq. (1)}$$

where W is the necessary lamp power, $W_o$ is the rated lamp power, $V_o$ is the rated lamp voltage, and k is a constant (1.54).

Substituting the specific numerical values for the respective factors of Eq. (1), $$V_1 = (320/640)^{1/1.54} \times 85 \approx 56.5 \text{ volts}$$

$$R_o = V^2/W_o = 85^2/640 \approx 11.29 \text{ ohms}$$

When the conventional single 85 volts and 640 watts lamp is turned on by 56.5 volts in order to change 640 watts to the necessary lamp power of 320 watts, current consumed is produced by:

$$V_1/R_o = 56.5/11.29 = 5 \text{ amperes}$$

When the voltage applied to a halogen lamp is greatly lowered, the fluctuation of color temperature of the lamp is increased. It will therefore be seen that selectively turning on two lamps saves current and, therefore, power compared to turning on a single lamp.

A reference will be made to FIGS. 10 to 12 for describing how the main reflector 42 reflects light. FIG. 10 shows a reflection condition as viewed from the front while FIGS. 11 and 12 each shows a reflection condition as viewed from the side.

As shown in the figures, rays directed downward from the light emitting portion 40a of the lamp 40 are reflected by the main reflector 42 to reach the glass platen 48, as indicated by arrows D. However, a part of the rays immediately below the lamp 40 is intercepted by the bulb of the lamp 40 resulting that the amount of light is reduced in a range which is indicated by leftward downward hatching. This particular range entails a decrease in the amount of light on an original document, causing ripples. Specifically, rays are affected by the bulb of the lamp 40 in a region n of the main reflector 42 and not affected in regions N, as shown in FIG. 10. The range n is dimensioned approximately one half the diameter of the lamp 40. As viewed from the side as shown in FIG. 11, a range m defined immediately below the lamp 40 is affected by the bulb of the lamp 40. Light in this affected region is approximately 20% lower in amount than light in the other or non-affected region, as measured on an original document (in FIG. 11, the ratio of the region indicated by leftward downward hatching to the region indicated by rightward downward hatching).

In the light of the above, the main reflector 42 in accordance with the present invention is configured such that, as shown in FIG. 12, the opening 42d is dimensioned wide enough to eliminate the interception by the bulb and increase the non-reflecting area, thereby lowering the amount of light in the range in which the rays are not intercepted. In such a configuration, the same amount of light is achievable in the range in which the bulb intercepts light and in the other range. Experiments showed that the opening 42d is substantially coincident with the position immediately below the focus of the main reflector 42. Hence, the front edge 78 of the opening 42d is positioned immediately below the focus of the lower elliptical surface 42b of the main reflector 42, i.e., immediately below the light emitting portion 40a of the lamp 40.

Figure 13:
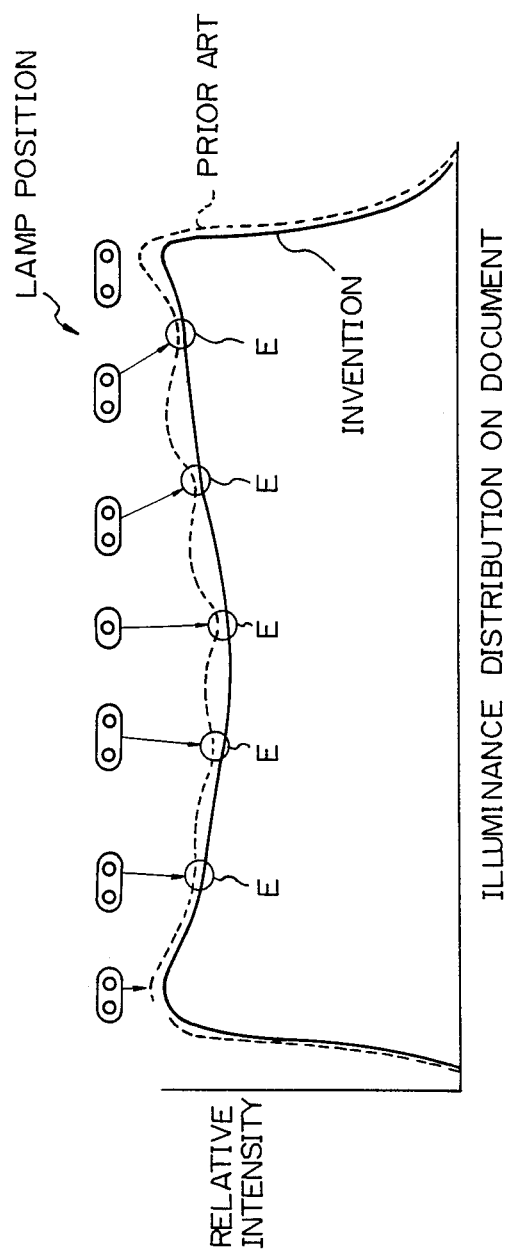
FIG. 13 is a graph showing an illuminance distribution on an original document attainable with the present invention and that particular to a prior art device.

FIG. 13 shows an illuminance distribution on an original document attainable with the device of the present invention having the openings 42d which are individually enlarged to the above-stated particular dimension, together with an illuminance distribution particular to a prior art device for comparison. As shown, the prior art device suffers from ripples because the illuminace on a document is lowered at each of the lamps as represented by circles E. In contrast, the device of the present invention provides desirable illuminance on a document with no regard to the positions of the lamps. By enlarging the openings 42d of the main reflector 42 as shown and described, ripples are substantially eliminated. Another possible approach for eliminating ripples is painting the inner surface of the main reflector 42 black to prevent it from reflecting light or treating it for diffusion. Still another possible approach is undulating that part of the main reflector 42 which corresponds to the area just below the bulb in which rays are intercepted. With any of such simple implementations, the device of the present invention avoids irregularity in illuminance and ripples and, therefore, provides attractive clear-cut copies which suffer from hardly any irregular density distribution and irregularity in color. Especially, the device of the present invention allows halftone images to be reproduced in a desirable condition.

Various modifications will become possible for those skilled in the art after receiving the teachings of the present disclosure without departing from the scope thereof.

What is claimed is:

1. A device for uniformly illuminating a slit-like area, comprising:
   a support member;
   a base plate removably mounted on said support member and having a feed circuit thereon;
   a reflector fixed to said support member and formed with a plurality of openings; and
   a plurality of lamps inserted in said openings of said reflector and arranged in an array in a lengthwise direction of said reflector, wherein said openings of said reflector are adjusted in position and dimensions to prevent bulbs of said lamps from intercepting light.

2. A device as claimed in claim 1, wherein one of said lamps is located on an optical axis which extends through the center of said reflector plate with respect to said lengthwise direction and perpendicularly to said lengthwise direction.

3. A device as claimed in claim 2, wherein a part of said lamps constitutes a first lamp group in which said lamps are arranged symmetrically with respect to said optical axis and individually spaced from said optical axis by first predetermined distances, and the other part of said lamps constitute a second lamp group in which said lamps are arranged symmetrically with respect to said optical axis and individually spaced from said optical axis by second predetermined distances which are different from said first predetermined distances of said first lamp group.

4. A device as claimed in claim 3, wherein said feed circuit on said base plate is constructed to feed current either independently or simultaneously to said first and second lamp groups as needed.

5. A device as claimed in claim 1, wherein an inner surface of said reflector is treated not to reflect light in order to prevent said bulbs of said lamps from intercepting light.

6. A device as claimed in claim 5, wherein said inner surface of said reflector is painted black.

7. A device as claimed in claim 1, wherein said inner surface of said reflector is treated to diffuse light.

8. A device for uniformly illuminating a slit-like area, comprising:
a support member;
a base plate removably mounted on said support member and having a feed circuit thereon;
a reflector fixed to said support member and formed with a plurality of openings; and
a plurality of lamps inserted in said openings of said reflector and arranged in an array in a lengthwise direction of said reflector, wherein a part of said lamps constitute a first lamp group in which said lamps are arranged symmetrically with respect to said optical axis and individually spaced from said optical axis by first predetermined distances, and the other part of said lamps constitute a second lamp group in which said lamps are arranged symmetrically with respect to said optical axis and individually spaced from said optical axis by second predetermined distances which are respectively different from said first predetermined distances of said first lamp group, and wherein said feed circuit on said base plate is constructed to feed current either independently or simultaneously to said first and second lamp groups as needed.

* * * * *